United States Patent
Masters et al.

(10) Patent No.: US 7,145,324 B2
(45) Date of Patent: Dec. 5, 2006

(54) SYSTEM AND METHOD FOR DRIVING A TACHOMETER

(75) Inventors: Stephen C. Masters, El Paso, TX (US); Douglas B. Waits, El Paso, TX (US)

(73) Assignee: Autotronic Controls Corporation, El Paso, TX (US)

(*) Notice: Subject to any disclaimer, the term of this patent is extended or adjusted under 35 U.S.C. 154(b) by 116 days.

(21) Appl. No.: 10/985,161

(22) Filed: Nov. 10, 2004

(65) Prior Publication Data

US 2005/0116703 A1    Jun. 2, 2005

Related U.S. Application Data

(63) Continuation-in-part of application No. 10/293,762, filed on Nov. 13, 2002, now abandoned.

(51) Int. Cl.
*G01P 3/48* (2006.01)

(52) U.S. Cl. .......................... 324/169; 324/166

(58) Field of Classification Search ........ 324/160–171; 73/488; 123/596–597, 594, 644
See application file for complete search history.

(56) References Cited

U.S. PATENT DOCUMENTS

| | | |
|---|---|---|
| 5,526,785 A | 6/1996 | Masters |
| 5,760,574 A | 6/1998 | Take et al. |
| 6,058,902 A | 5/2000 | Jacobs et al. |
| 6,073,087 A | 6/2000 | Thiele et al. |
| 6,112,138 A | 8/2000 | Dannenberg |
| 6,137,399 A | 10/2000 | Westberg et al. |
| 6,196,208 B1 | 3/2001 | Masters |
| 6,200,177 B1 | 3/2001 | Scott et al. |
| 6,222,445 B1 | 4/2001 | Beckhusen |
| 6,253,143 B1 | 6/2001 | Silvernagle et al. |

FOREIGN PATENT DOCUMENTS

GB        2256456 A    *    9/1992

* cited by examiner

*Primary Examiner*—Jay M. Patidar
(74) *Attorney, Agent, or Firm*—Fitch, Even, Tabin & Flannery (57) ABSTRACT

An electronic driver and method for producing an output waveform for use by a tachometer comprises an input line that is connected in series with at least one ignition coil. The at least one ignition coil is driven during at least one current dwell period per an ignition cycle. A signal representative of at least one spark is caused to be generated on the input line by the at least one ignition coil during the at least one current dwell period of the ignition cycle. A controller is coupled to the input line. The controller discriminates between single and multiple sparks over consecutive ignition cycles. The signal is representative of at least one spark received on the input line from the at least one ignition coil. The controller responsively forms an output waveform having substantially equally spaced pulses aligned with the first spark and the output waveform corresponds to the ignition cycle received on the input line.

20 Claims, 7 Drawing Sheets

SYSTEM AND METHOD FOR DRIVING A TACHOMETER

CROSS REFERENCES TO RELATED APPLICATIONS

This application is a continuation-in-part application of U.S. application Ser. No. 10/293,762, filed on Nov. 13, 2002, which is incorporated herein by reference in its entirety.

FIELD OF THE INVENTION

The present invention relates generally to ignition systems for internal combustion engines and, more particularly, to a system for generating signals for use by automotive devices.

BACKGROUND OF THE INVENTION

A tachometer is often used for measuring velocity and operates much like a generator. For example, when a motor drives the tachometer, the tachometer generates an output voltage. The produced output voltage is proportional to the velocity of the motor. The velocity signal may then be fed to a rate indicator to display the velocity to the operator, or it can be used to close a velocity loop. More particularly, the tachometer drive circuit receives pulses from an ignition coil in the ignition system of the motor and then displays these pulses as engine speed.

One method by which tachometer or ignition trigger signals may be generated is by inductively coupling a magnetic sensing pickup on the ignition coil high voltage spark output wire. This method has been used in ignition timing lights for decades. U.S. Pat. No. 6,058,902 to Jacobs discloses a circuit in which the original vehicle ignition coil high-tension lead is connected to a sense resistor to sense the ignition trigger for an after-market ignition trigger input. Other methods include tapping into the ignition coil negative lead to monitor the coil kickback signal when the coil is fired on an inductive ignition coil to generate the tachometer signal. A disadvantage of these methods is their inability to produce a clean tachometer output signal using simple, reliable, low cost circuitry.

Further, a particularly significant limitation of the prior art methods described above is their inability to extract a clean accurate tachometer signal from an ignition coil that is in multi-spark operation. As such, regardless of the method used to detect coil operation, the multi-spark signal must be managed to provide a proper tachometer output signal. Another limitation is that in an engine having multiple coils, each of the coils must be connected to the tachometer signal generating circuit, resulting in the need for up to eight inputs on a coil per plug ignition system. Furthermore, extra wires are often needed for providing battery voltage to the signal generating circuit. In addition, many of the existing methods do not have the capability to be used universally in all existing single and multiple ignition coil equipped vehicles.

SUMMARY OF THE INVENTION

In order to address the need for a clean and accurate tachometer signal to be extracted from an ignition coil in multi-spark operation and others, there is provided a digital ignition system tachometer (DIS-tach) driver that is used to convert the ignition coil signal from one or more ignition coils to a signal that is capable of driving tachometers, shift lights, RPM activated switches and similar devices that require an engine RPM signal.

In many of these embodiments, an electronic driver comprises an input line that is connected in series with at least one ignition coil. The at least one ignition coil is driven during at least one current dwell period per an ignition cycle. A signal representative of at least one spark is caused to be generated on the input line by the at least one ignition coil during the at least one current dwell period of the ignition cycle. A controller is coupled to the input line. The controller discriminates between single and multiple sparks over consecutive ignition cycles. The signal is representative of at least one spark received on the input line from the at least one ignition coil. The controller responsively forms an output waveform having substantially equally spaced pulses and the output waveform corresponds to the ignition cycle received on the input line.

Numerous advantages are realized with the DIS-tach driver described herein. For example, the DIS-tach driver may be connected with only a single splice in the vehicle coil harness to draw power and detect coil current for generation of the tachometer output signal. This results in an inexpensive and simple fitting of the DIS-tach driver to the engine.

An additional advantage is the universality of the device. In particular, the DIS-tach driver may be connected to most vehicles having one or more ignition coils. Particularly significant is that the DIS-tach drive is compatible with vehicles that provide multi-spark operation of the ignition coils without requiring the user to program the cylinder count.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENTS

Figure 1A:
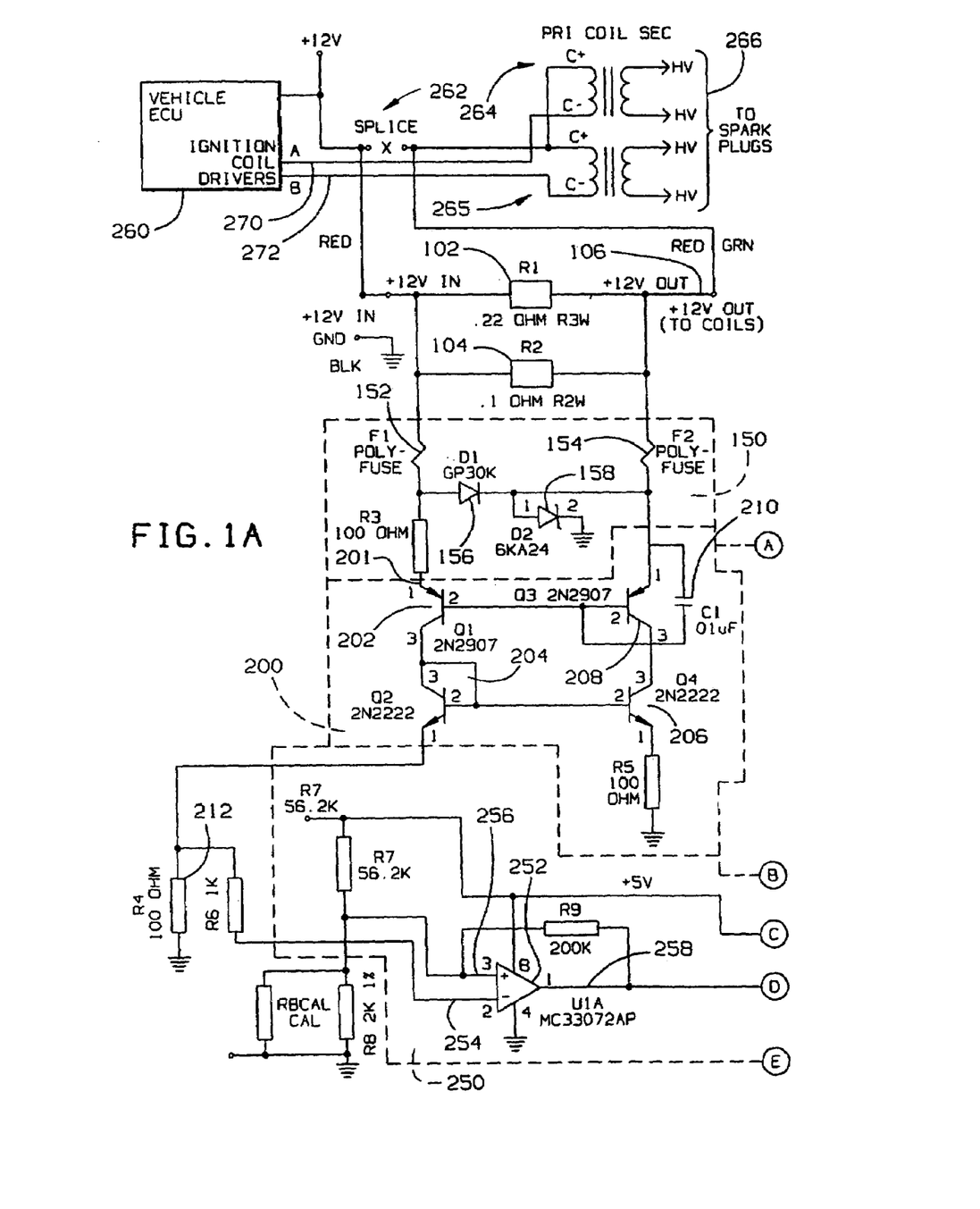
FIGS. 1A and 1B are schematic diagrams of the digital ignition system tachometer driver according to the present invention.
Figure 1B:
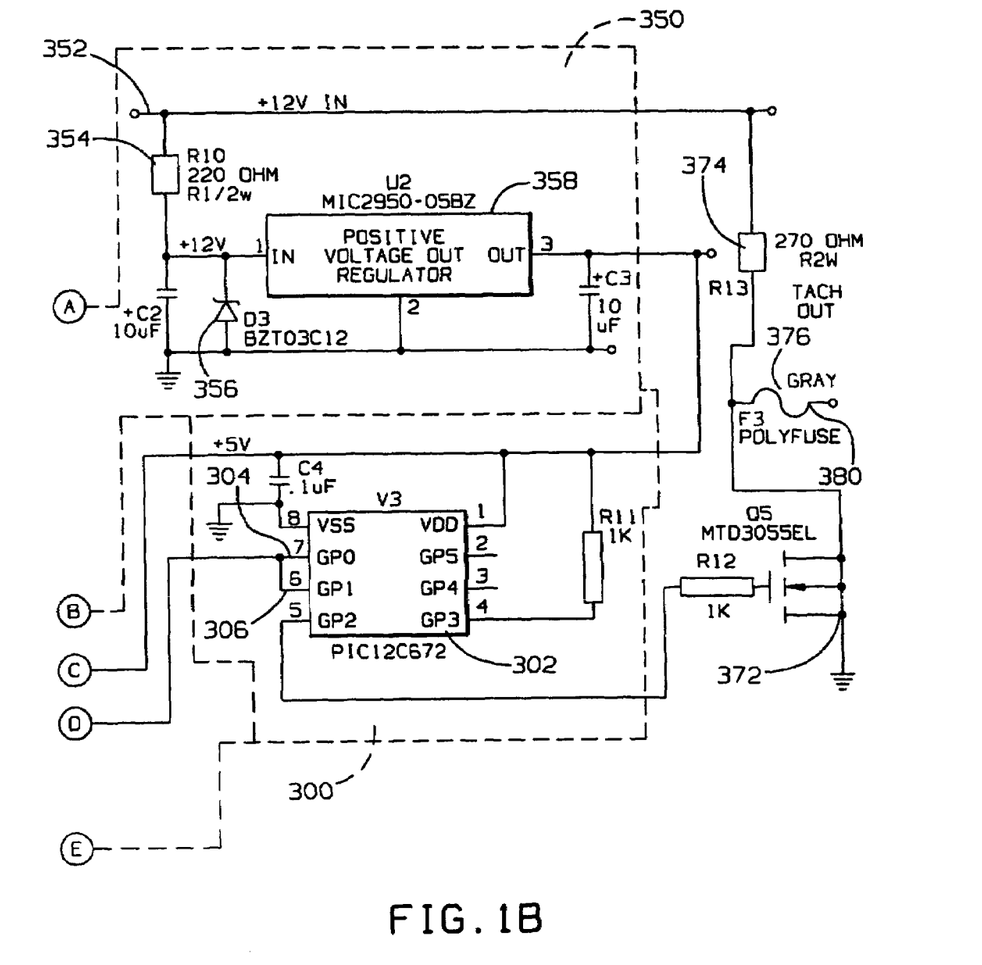

Referring now to FIGS. 1a and 1b, one example of a digital ignition system tachometer driver in accordance with the present invention is illustrated. A vehicle electronic control unit (ECU) 260 is coupled to the primary winding of coils 264 and 265 via a splice 262 and lines 270 and 272.

Voltage is input at the +12V IN terminal and at the 12V Out terminal. The splice 262 is between the +12 V battery supply and the ignition coil primary windings 264 and 265. Lines 266 from the secondary windings of the coils 264 and 265 are coupled to spark plugs (not shown). Although two coils are shown, it will be understood one coil may be used or more than two coils may be used.

A DIS-tach driver of FIGS. 1a and 1b is an electronic device that is connected to the ignition coils of the ignition of an automobile. The DIS-tach driver of FIGS. 1a and 1b includes a current mirror 200 for mirroring the coil current, a voltage comparator 250 for comparing the mirrored current to a reference voltage, and a mode detector 300 for determining whether the coils are operating in a multispark mode. Advantageously, a reverse-polarity and over-voltage protection circuit 150 is provided to protect the current mirror. Similarly, an input current and voltage limiting circuit 350 is provided for protecting the tachometer driver circuit.

The DIS-tach driver of FIGS. 1a and 1b is connected to the ignition coil, coil pack, or coils (not shown) using a simple shunt resistor wired in series between the battery and the coils primary. The coil is driven by the vehicle ECU to produce multi-sparks at a spark plug. Thus, the primary current period measured represents the multi-spark time period. This period is labelled as the T1, T2, and T3 RefPeriods in FIGS. 2, 3, and 4.

The shunt resistor may be of any low value to limit the maximum voltage drop between an ignition switch and the ignition coil input. By way of example and not limitation, for example, the value of the sense resistor is shown to be 0.06875 ohms, consisting of one 0.1 ohm two-watt resistor 104 connected in parallel to one 0.22 ohm three-watt resistor 102. The input to the DIS-tach driver is from a positive 12 volt source, such as the automobile battery. It is to be understood that the actual hook-up will vary between makes and models of automobiles and that the above description is by way of example and not limitation.

The coil current is mirrored by a four-transistor current mirror 200 that is used to generate a ground referenced voltage signal proportional to the ignition coil primary current. The current mirror 200 in an exemplary embodiment includes two PNP transistors 202, 208, two NPN transistors 204, 206 and an AC bypass capacitor 210. The PNP transistors, which may be 2N2907 silicon (bipolar) transistor amplifiers, are available from Fairchild Semiconductor and the NPN transistors, which may be 2N2222 silicon (bipolar) transistor amplifiers, are available from Motorola. Other similar transistors may be used as well.

A particular advantage of the AC bypass capacitor 210, which may be a 0.01 micro-farad capacitor connected from the collector to emitter of the PNP transistor 208, is that AC current is bypassed around the transistor 208. This ensures that the current mirror 200 will not latch-up due to any slight imbalance that may result in mismatched gains in the four transistor mirror network. In particular, the capacitor 210 prevents even small voltage errors from causing the mirror 200 to fail to track the shunt resistor when voltage is ramping. It is to be noted that other current sensing means may also be used also sense coil currents. Such devices include, but are not limited to, current transformers, optical isolators, current sensing integrated circuits, hall-effects, magneto-restrictive devices and others.

The current mirror proportioned signal from the current mirror 200 is compared to a voltage reference, representative of about 2.5 amperes by an operational amplifier (op-amp) 252 configured as a voltage comparator 250. The op-amp 252 may be a type such as the MC33072AP from ON-Semiconductor, which is rated for −40 to +85 degree Celsius operation. Advantageously, using the op-amp 252, instead of a discrete voltage comparator, results in a fast slew rate of about two volts/microsecond. This results in quieter operation than most available voltage comparators. It is to be understood that a voltage comparator or other voltage comparison device may be used instead of the exemplary op-amp 252.

Figure 2:
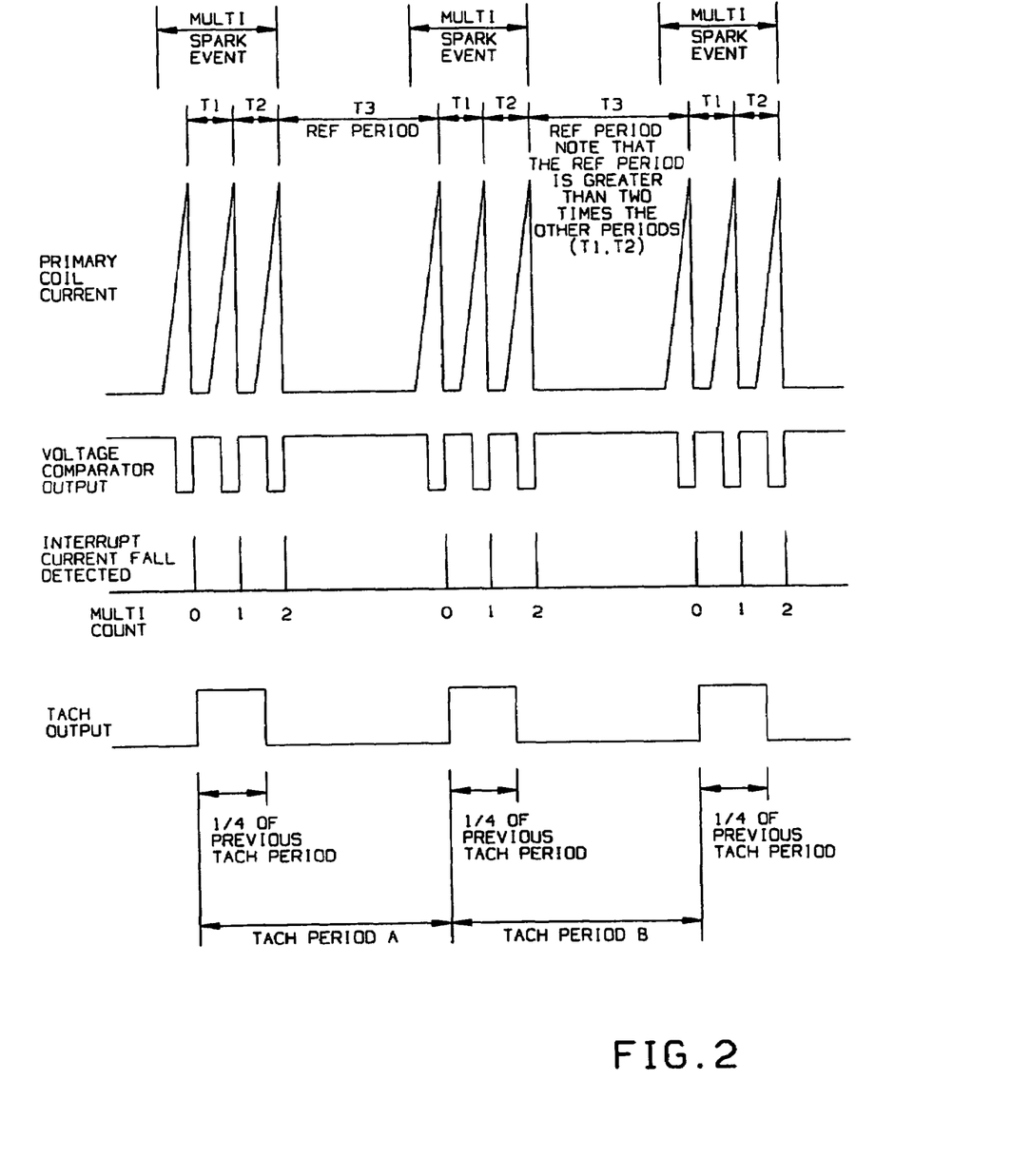
FIG. 2 is a timing diagram of a three-spark multispark ignition coil system of the digital ignition system tachometer driver of FIG. 1 according to the present invention.
Figure 3:
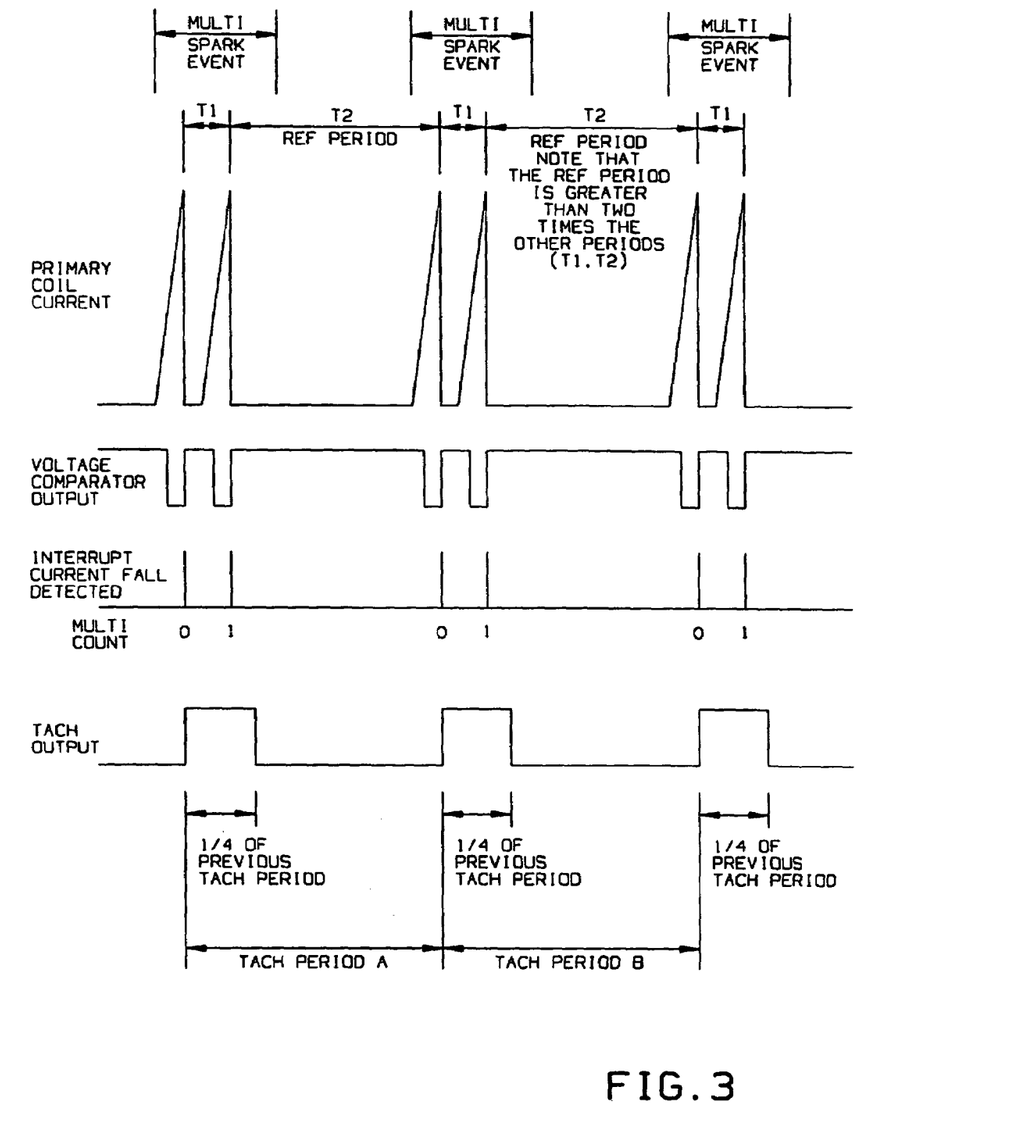
FIG. 3 is a timing diagram of a two-spark multispark ignition coil system of the digital ignition system tachometer driver of FIG. 1 according to the present invention.
Figure 4:
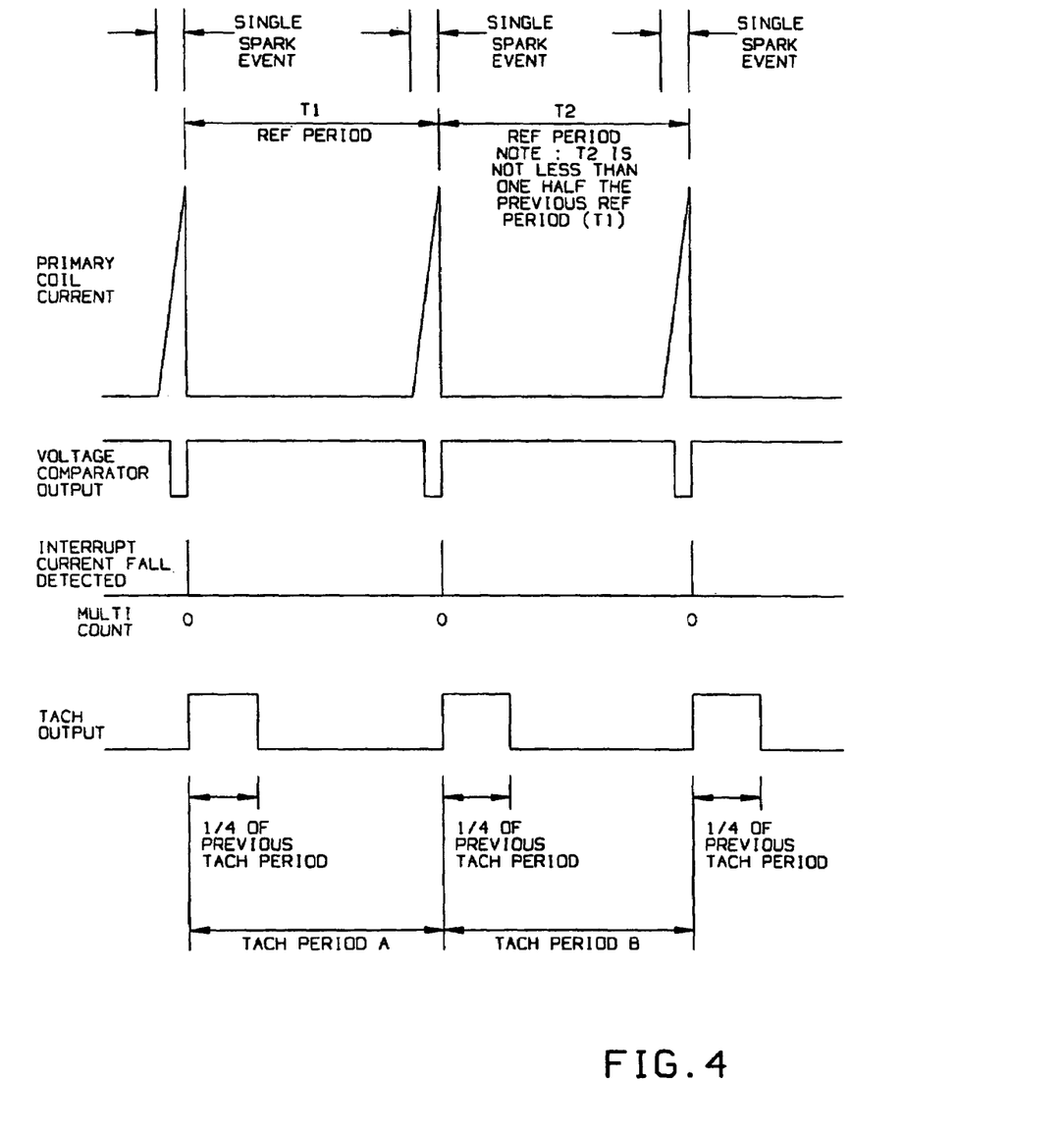
FIG. 4 is a timing diagram of a single-spark ignition coil system of the digital ignition system tachometer driver of FIG. 1 according to the present invention.

The output of the comparator 250 goes low when the sensed ignition coil current rises above the 2.5 amp reference. Referring now to FIGS. 2, 3, and 4, it can be seen that the output of the comparator 250 goes low at a current level of about 2.5 amps, or approximately one-half of the peak primary coil current. The current mirror signal generates a voltage across a 100-ohm resistor 212 and is input at the inverting input pin 254 of the op-amp 252. A current reference voltage of about 0.172 volts is input at the non-inverting input 256 of the op-amp 252.

The output 258 of the op-amp 252 at pin 1 is then fed to the mode detector 300. In particular, the output signal 258 is connected to the input pins 304, 306 of a microcontroller 302, which may be, for example, an 8-bit microcontroller in an 8-pin package such as the PIC12C672 from Microchip Technology Inc. The microcontroller 302 receives the signal from the comparator 252 when the ignition coil current is greater than 2.5 amps and generates an interrupt on the rising edge of the signal 258. The signal 258 is then processed by the microcontroller 302 to measure the time periods of the incoming signal. Signal 258 is labelled Voltage Comparator Output in FIGS. 2, 3, and 4. This signal is discriminated to be a multi-spark or normal signal by the microcontroller 302. This is accomplished by analyzing the input signal time period in multiple increments labelled as the T1, T2, and T3 periods in FIGS. 2, 3, and 4.

The following exemplary method of operation uses three sequential time periods but could use any number of three or more periods for discriminating multispark operation. The choice of three time-period measurements for the DIS-tach device of FIGS. 1a and 1b is based on the maximum multi-sparks available on a Ford Motor Company (Ford) DIS equipped vehicle. The Ford DIS ignition coil outputs from one to three multi-sparks, three being the most at idle speed. Therefore, measuring these three spark time periods provides a spark period of two small periods to one larger period as illustrated in FIG. 2. The larger period T3 must be at least two times greater than the small periods T1 and T2 to be discriminated as being a multi-spark period. After the microcontroller 302 has detected eight incoming voltage comparator sensed signals, the time periods are calculated and one Tach output signal is output every engine cylinder period, i.e., every 90 degrees for an 8-cylinder engine. When the input signal is normal, as in FIG. 4, e.g. not multi-sparking, the input voltage comparator signal is evenly spaced and the microcontroller measures each input period with less than a 2:1 change; the microcontroller outputs a tachometer signal for each input signal. This approach is described in greater detail with respect to FIGS. 5 and 6 elsewhere in this application.

The tachometer output signal is synchronous with the rising edge of the voltage comparator signal at the last wide reference input period; aligned with the normal first spark of each cylinder firing. The time input periods are measured from fall to fall of the coil signal, by the microcontroller 302, which is representative of the time when each coil is providing spark to the spark plugs. If the measured reference input period is not less than one-half the previous reference period then the microcontroller outputs a tachometer signal for every input signal because the coil is not in multi-spark mode of operation. The microcontroller MultiCount value remains at zero during single spark operation resulting in each time period becoming the new reference period. The output tachometer signal duration is limited to 2 milliseconds or 25% of the tachometer period. This duration limit allows all tachometers, shift lights, and other RPM input devices to function without any cylinder information programming of the DIS-tach driver.

The microcontroller 302 does not calculate RPM or degrees for any of the measurements, only time is measured for input periods and Tach output signal duration. This allows the microcontroller to be run with an internal 4 MHZ clock and does not require any cylinder programming of the microcontroller for use on engines with any number of cylinders. The only exception of the input/cylinder count is that the cylinders must have a symmetrical firing pattern. This means that the use of the DIS tachometer Driver when used on a V-10 engine, such as the Dodge Viper, will have a odd firing pattern of 90/54 degrees and requires a modified microcontroller to accept the asymmetrical input signal and convert it to a symmetrical output and an engine repetition rate of 90 degrees to use a conventional after market tachometer or other RPM input device for use on 8 cylinder engines. In other words, the approaches described herein operate on any engine with a symmetrical firing order. The input signal may be evenly or non-evenly spaced. However, the output signal is always substantially symmetrical or evenly spaced.

The microcontroller 302 can be programmed with the required algorithm to support this odd-fire application as well as other odd-fire engines like the Buick V-6 odd fire engine. The microcontroller 302 drives a power MOSFET transistor 372, such as a Motorola MTD3055EL, which is connected to a 270-ohm 2-watt pull up resistor 374, and to the output polyfuse 376. The output polyfuse 376 provides a self-resetting function in the event of a short to positive battery voltage to protect the power MOSFET 372.

The DIS-tach driver of FIGS. 1a and 1b also provides for reverse polarity and over-voltage protection. As described above, the internal current mirror 200 uses four signal transistors 202, 204, 206, and 208. The transistors 202, 204, 206, 208 are subject to possible damage if subjected to high voltages caused by a "load dump" or other over-voltage surges.

To reduce the chance of such damage, the voltage protection circuit 150 includes a pair of polyfuses 152, 154, a diode 156, and a transient surge suppressor diode 158. The clamping action of the suppressor diode 158 limits the maximum emitter terminal voltage of the current mirror input 201 to about 33 volts, which is below the breakdown rating of the current mirror transistors 202, 204, 206, 208. As the suppressor diode 158 clamps the input voltage at the cathode of diodes 156, 158, the balance of the over-voltage is developed across the polyfuses 152, 154. This large clamp current through the polyfuses 152, 154, through the diodes 156, 158 to ground causes rapid heating of the polyfuses 152, 154. As a result, the polyfuses 152, 154 become open-circuited, which then drops the current to a few milliamps until the over-voltage ceases. Once the over-voltage has ceased, the polyfuses 152, 154 cool and revert to a low impedance state, which results in reconnecting the input current signal to the mirror, thereby allowing continued operation of the DIS-tach driver of FIGS. 1a and 1b.

There is also provided an input current and voltage limiting circuit 350 to protect the DIS-tach driver of FIGS. 1a and 1b. The limiting circuit 350 is connected on the positive input 352 to the DIS-tach driver. The limiting circuit 350 includes a current limiting resistor 354, a zener diode 356 and a low-voltage dropout regulator 358. By way of example, the current limiting resistor is a 220 ohm ½-watt resistor, the diode 356 is a 12-volt, 3-watt zener, such as the BZT03C from Philips Semiconductor, and the low-voltage dropout regulator 358 is a MIC2950-05BZ from Micrel Semiconductor.

The limiting circuit 350 provides operating voltage of +5Vdc to the op-amp 252 and microcontroller 302 from the ignition switched +voltage input 101 and is clamped to fewer than 12.5 volts by the diode 356 and regulated to precisely 5 volts by the low voltage dropout regulator 358. Advantageously, the DIS-tach driver of FIGS. 1a and 1b operates with an output down to typically about 6.5 volts battery input.

Referring now to FIGS. 2–4, examples of the input and output waveforms of the DIS-tach driver are described illustrating aspects of the functioning of the circuit of FIGS. 1a and 1b. These diagrams show a primary coil current, interrupt detection, a MultiCount value, a Tach output drive signal (Tach Output), and the output of voltage comparator 250 representative of the primary coil current shown in FIGS. 2–4. The diagrams also show several parameters used/processed by the microcontroller 302 in its processing and described below with respect to FIGS. 5 and 6. These parameters include an interrupt signal, which indicates that the primary coil current fall has been detected and a MultiCount variable, indicating the number of current falls in an ignition cycle or TachPeriod.

As can be seen in the waveforms of FIGS. 2–4, the driver signal output to the tachometer (Tach Output) is always a substantially evenly or symmetrically spaced waveform. It has a duty cycle that the microcontroller sets to be 25 percent of the previous tachometer period, or limited to 2 milliseconds maximum duration, which is the period of cylinder firing, i.e., the period between cylinders such as 90 degrees for an 8-cylinder engine. As shown in these figures, the input signal in the driver, which is the voltage comparator signal in FIGS. 2–3 and signal 258 of FIG. 1a and which is representative of the coil primary current, can be symmetrically spaced or non-symmetrically spaced. FIG. 4 shows the voltage comparator signal being symmetrically spaced when in single spark mode of operation. The non-symmetrical spacing can be caused by the operation of the vehicle ECU driving the coil primaries with a multi spark mode of operation.

The current dwell period shown in FIGS. 2–4 is the time that the coil primary current is flowing and begins when the vehicle ECU ignition coil driver turns on, effectively providing a conductive path from the coil's negative primary terminal to ground. In these figures, the primary coil current is shown ramping from zero amps to peak coil current. The current dwell period also corresponds to the period of time the primary current ramps to the peak value. At the peak current value, the coil is turned off to allow the primary current to collapse to induce a secondary voltage rise across the secondary coil winding attached to spark plugs. The measured spark period is from the coil primary turn off to the next coil primary turn off and is labeled as T1, T2, and T3 in the figures. The microcontroller 302 measures the periods to discriminate when the input signal has a multi-spark period or a single spark period. The T1, T2, and T3 time periods are periods measured and used for the discrimination process by the microcontroller 302.

Referring now to specifically FIG. 2, a multi-spark event is illustrated. T1 and T2 are the short periods between current fall edges and T3 is longer and therefore becomes the reference period. In this case, T3 reference period is greater than two times the periods T1 and T2. It can be seen that the output waveform (Tach Output) is evenly spaced having an "on" period of one-fourth of the previous TachPeriod or ignition cycle period, and that the Tach Output signal is aligned with the falling edge of the first coil current falling edge. The Tach Period is relative to the cylinder firing period, i.e., for an 8-cylinder engine this would be 90 degrees of crankshaft rotation. Keeping the Tach output signal aligned with the first spark helps prevent jitter in the Tach output signal when the ECU is changing from multiple to single spark and single to multiple spark operation.

Referring now to FIG. 3, a multi-spark event is again illustrated. T1 is the shorter period between current fall edges and T2 is the longer reference period. The T2 reference period is greater than two times the period T1. It can be seen that the output waveform (Tach Output) is evenly spaced having an "on" period of one-fourth of the previous TachPeriod, and that the Tach Output signal is aligned with the falling edge of the first coil current falling edge. The Tach Period is relative to the cylinder firing period, i.e., for an 8-cylinder engine this would be 90 degrees of crankshaft rotation.

Referring now to FIG. 4, a single-spark event is illustrated. T1 and T2 are the periods between current fall edges and both periods are reference periods. In this mode, the T2 period is not less than one-half of the reference period T1. Also, in this mode where T1 is nearly equal T2, the reference period is being selected for either the T1 or T2 periods. This can be seen by the MultiCount value in FIG. 4 remaining at a count of zero. It can be seen that the output waveform (Tach Output) is evenly spaced having an "on" period of one-fourth of the previous TachPeriod, and that the Tach Output signal is aligned with the falling edge of the coil current falling edge. The Tach Period is relative to the cylinder firing period, i.e., for an 8-cylinder engine this would be 90 degrees of crankshaft rotation. A current dwell period is also indicated. The discrimination process by the controller 302 is performed over several consecutive ignition cycles as indicated in FIGS. 2–6.

Figure 5:
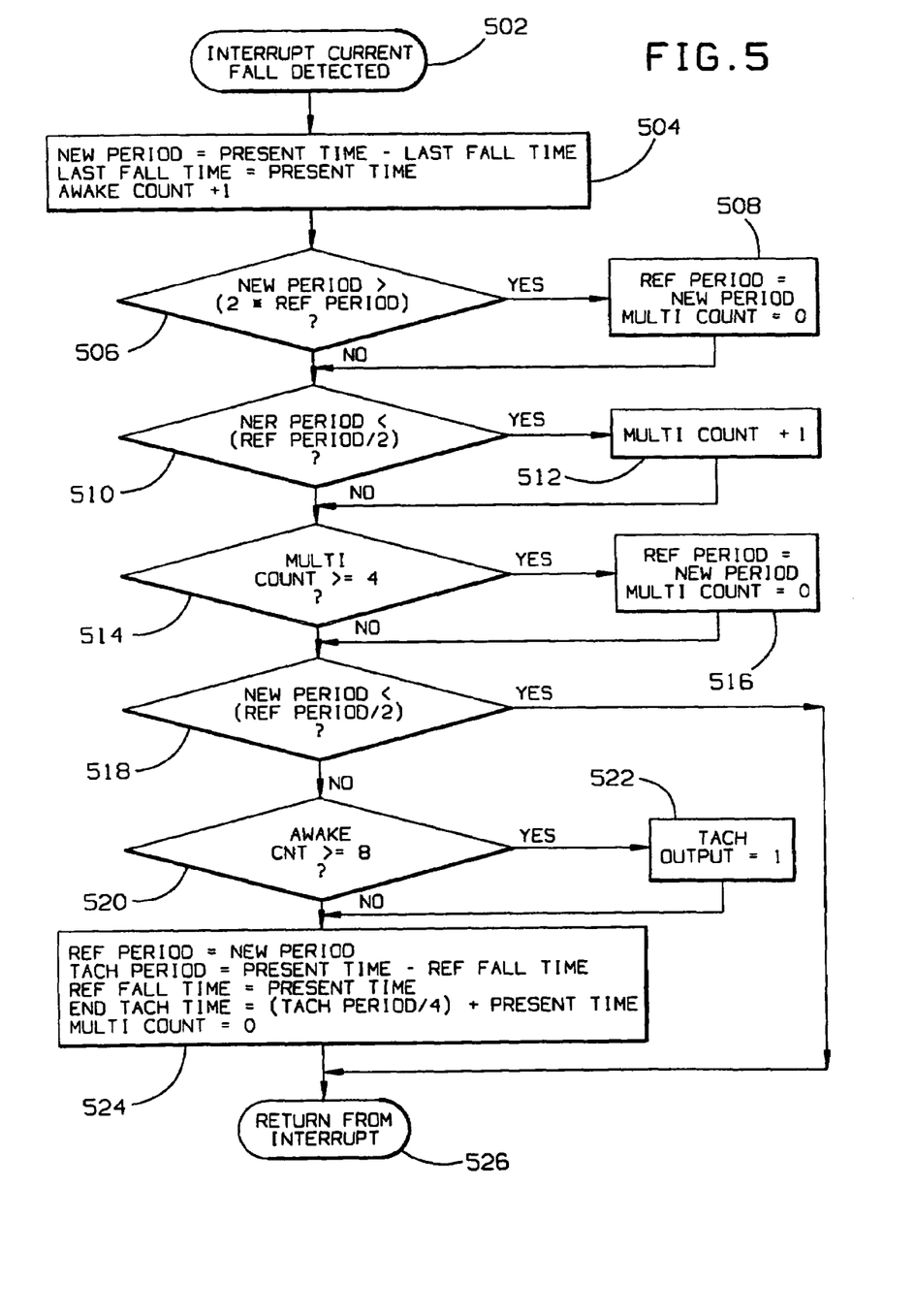
FIG. 5 is a flowchart of one example the operation of a driver according to the present invention.

Referring now to FIG. 5, one example of the operation of a driver using a controller (e.g., microcontroller 302 of FIG. 1b) is described. At step 502, an interrupt is detected indicating that a current fall of the primary coil current has been detected. At step 504, a variable NewPeriod is set equal to the present time minus the last fall time. The last fall time is set equal to the present time and the variable AwakeCount is incremented by one.

At step 506, it is determined if the NewPeriod is greater than twice the reference period. If the answer is negative, execution continues at step 510. If the answer is affirmative, then at step 508 the RefPeriod variable is set equal to NewPeriod and MultiCount is set to 0.

At step 510, it is determined if NewPeriod is less than one-half of the RefPeriod. If the answer is negative, execution continues at step 514. If the answer is affirmative, then at step 512, MultiCount is incremented by one.

At step 514 it is determined if MultiCount is greater than or equal to four. If the answer is negative, execution continues at step 518. If the answer is affirmative, then at step 516, RefPeriod is set to NewPeriod and MultiCount is set to zero.

At step 518 it is determined if NewPeriod is less than one-half of the RefPeriod. If the answer is negative, execution continues at step 520. If the answer is affirmative, then execution continues at step 526.

At step 520 it is determined if AwakeCount is greater than or equal to eight. If the answer is negative, execution continues at step 524. If the answer is affirmative, then at step 522, TachOutput is set to one. TachOutput is used to drive the tachometer.

At step 524, the Reference Period is set to NewPeriod. The TachPeriod is set to the PresentTime minus the RefFallTime. The RefFallTime is set equal to the present time. The EndTachTime is set equal to the TachPeriod divided by four plus the Present Time. MultiCount is set to 0. At step 526, a return from the interrupt is made.

Figure 6:
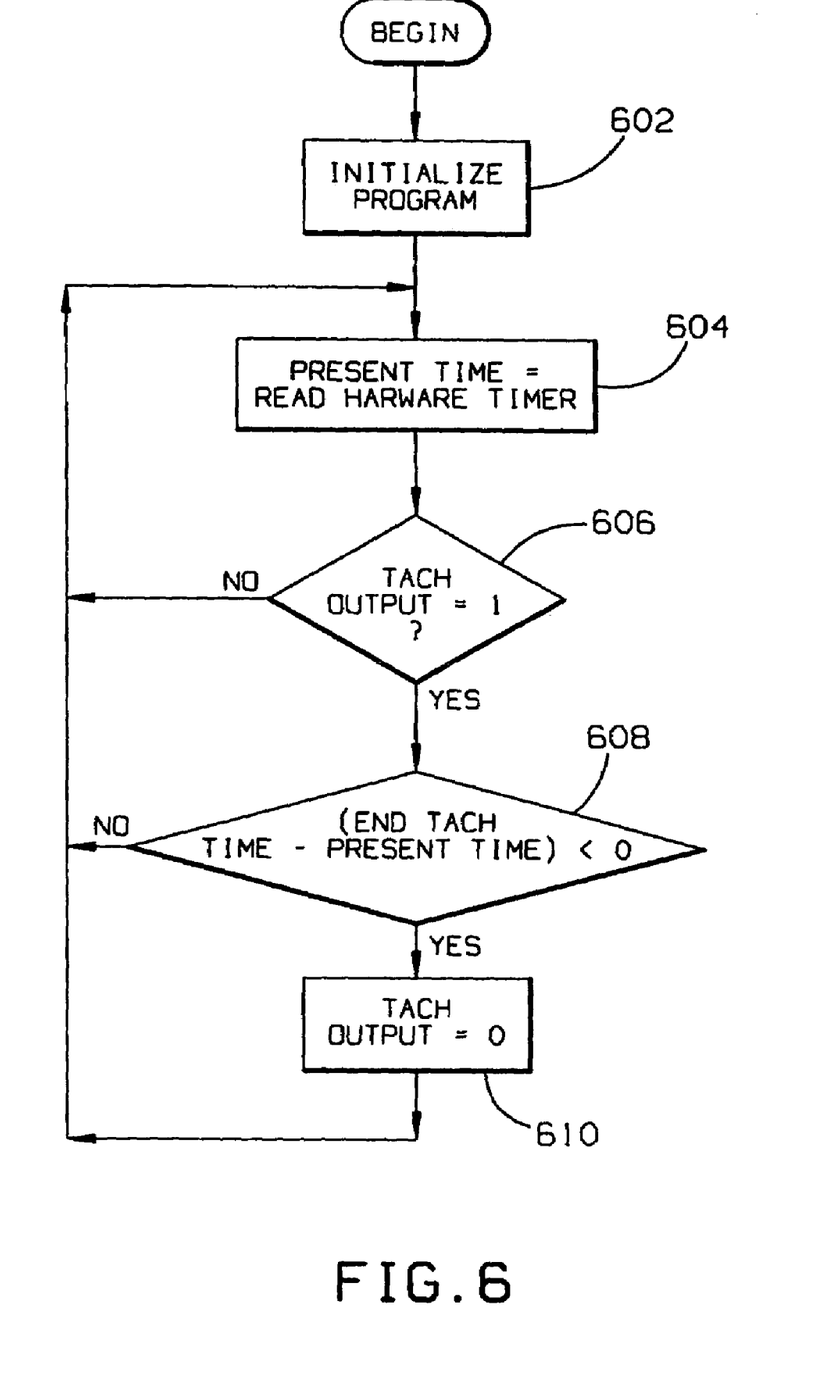
FIG. 6 is a flowchart of one example the operation of a driver according to the present invention.

Referring now to FIG. 6, one example of the operation of a driver using a controller (e.g., microcontroller 302 of FIG. 1b) is described. At step 602, the program is initialized. At step 604, the variable PresentTime is set to the value of the hardware timer. At step 606, it is determined if TachOutput is set to one. If the answer is negative, control returns to step 604. If the answer is affirmative, then control continues at step 608.

At step 608 it is determined if the EndTachTime minus the PresentTime is less than 0. If the answer is negative, control returns to step 608. If the answer is affirmative, then at step 610, TachOutput is set to zero. Control then returns to step 604 and execution continues as described above.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. An electronic driver for producing an output waveform for use by a tachometer, comprising:

an input line connected in series with at least one ignition coil, the at least one ignition coil driven during at least one current dwell period per an ignition cycle, wherein input signals representative of single and multiple sparks are received on the input line from the at least one ignition coil; and a controller coupled to the input line, the controller programmed to discriminate between the single and multiple sparks represented by the input signals during consecutive ignition cycles, the controller further programmed to responsively form an output waveform having substantially equally spaced pulses.

2. The electronic driver of claim 1 wherein the input line is connected to the at least one ignition coil using a single wire splice.

3. The electronic driver of claim 1 wherein the at least one ignition coil comprises a single ignition coil.

4. The electronic driver of claim 1 wherein the at least one ignition coil comprises multiple ignition coils.

5. The electronic driver of claim 1 wherein the at least one ignition coil provides a non-symmetrical signal to the electronic driver.

6. The electronic driver of claim 1 further comprising a current mirror for generating a reference signal proportional to an amplitude of a primary coil current of the at least one ignition coil.

7. The electronic driver of claim 6 wherein the current mirror comprises an AC bypass portion for preventing errors caused by a voltage imbalance in the current mirror.

8. The electronic driver of claim 1 wherein the controller comprises means for limiting a duration of the output waveform.

9. The electronic driver of claim 1 wherein the controller comprises means for generating the output waveform without calculating a parameter chosen from a group comprising a cylinder RPM and a cylinder degree.

10. The electronic driver of claim 9 wherein the controller comprises means for measuring input time periods of the input signals received on the input line and wherein the controller discriminates input time periods of the input signals to generate equally spaced output pulses.

11. The electronic driver of claim 1 further comprising a self-resetting circuit, the self-resetting circuit resetting in response to an over voltage condition of the electronic driver.

12. A method for producing an output waveform at a driver for use by a tachometer, the method comprising:
   receiving an input signal from at least one ignition coil, the input signal including at least one current dwell period for each ignition cycle, the input signal representing single and multiple sparks;
   measuring at least one reference time period of the input signal;
   discriminating between the single and multiple sparks represented in the input signal; and
   forming an output waveform, the output waveform comprising substantially equally spaced pulses and corresponding to the ignition cycles; and
   aligning the output waveform with a first spark of an ignition cycle to prevent jitter in the output waveform when the input signal changes between a single spark mode of operation and a multispark mode of operation and changes between a multispark mode of operation and single spark mode of operation.

13. The method of claim 12 further comprising mirroring a current of the at least one ignition coil and responsively generating a reference signal proportional to a coil supply current.

14. The method of claim 12 wherein the receiving comprises receiving the input signal via a single splice.

15. The method of claim 12 further comprising supplying a reset circuit at the driver and limiting voltage surges using the reset circuit.

16. The method of claim 12 further comprising supplying a current mirror in the driver and bypassing an AC current around the mirror to prevent mirror failure.

17. The method of claim 12 further comprising limiting a duration of the output waveform.

18. The method of claim 12 wherein forming the output waveform further comprises forming the output waveform without measuring an engine RPM or cylinder degrees.

19. The method of claim 12 further comprising detecting an over voltage condition at the driver and responsively performing a reset operation at the driver using a reset circuit.

20. The method of claim 12 wherein the output waveform is aligned with the first spark of a multispark event.

* * * * *